(12) United States Patent
Schadt et al.

(10) Patent No.: US 6,300,991 B1
(45) Date of Patent: Oct. 9, 2001

(54) PHOTO-ORIENTED POLYMER NETWORK MATERIAL HAVING DESIRED AZIMUTHAL ORIENTATION AND TILT ANGLE AND METHOD FOR ITS PRODUCTION

(75) Inventors: Martin Schadt, Seltisberg (CH); Andreas Schuster, Freiburg; Hubert Seiberle, Weil am Rhein, both of (DE)

(73) Assignee: Rolic AG, Basle (CH)

( * ) Notice: Subject to any disclaimer, the term of this patent is extended or adjusted under 35 U.S.C. 154(b) by 0 days.

(21) Appl. No.: 09/510,364

(22) Filed: Feb. 22, 2000

Related U.S. Application Data

(63) Continuation of application No. 08/690,665, filed on Jul. 26, 1996, which is a continuation-in-part of application No. 08/601,310, filed on Feb. 16, 1996, now Pat. No. 5,838,407, which is a continuation of application No. 08/373,733, filed on Jan. 17, 1995, now abandoned, which is a continuation of application No. 08/271,550, filed on Jul. 7, 1994, now abandoned, which is a continuation of application No. 08/125,005, filed on Sep. 21, 1993, now abandoned, which is a continuation of application No. 07/910,066, filed on Jul. 8, 1992, now abandoned.

(30) Foreign Application Priority Data

Jul. 28, 1995 (CH) ............................................ 2218/95
Mar. 15, 1996 (CH) ............................................ 688/96

(51) Int. Cl.$^7$ ........................................................ G02F 1/1333
(52) U.S. Cl. ..................................................................... 349/124
(58) Field of Search ........................................................ 349/124

(56) References Cited

PUBLICATIONS

Hashimoto et al, "TN–LCD with Quartered Subpixels Using Polarized UV–Light–Irradiated Polymer Orientation Films" SID 1995, pp. 877–880, 1995.*

* cited by examiner

*Primary Examiner*—James A. Dudek
(74) *Attorney, Agent, or Firm*—Finnegan, Henderson, Farabow, Garrett & Dunner L.L.P.

(57) ABSTRACT

Orientation layers of monomeric or polymeric liquid crystal layers having any desired azimuthal orientation direction and a tilt angle are produced by irradiating at an angle differing from the normal to the surface photopolymers orienting parallel to linearly polarized light.

25 Claims, 2 Drawing Sheets

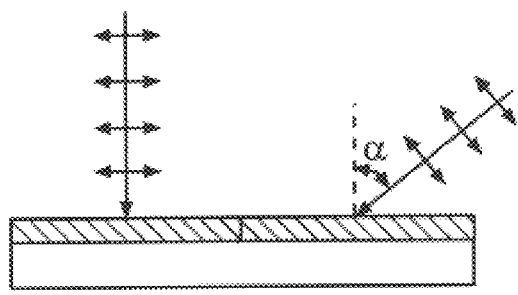
FIG. 1
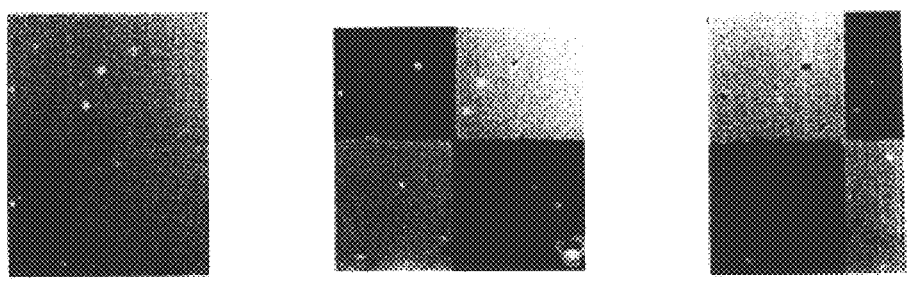
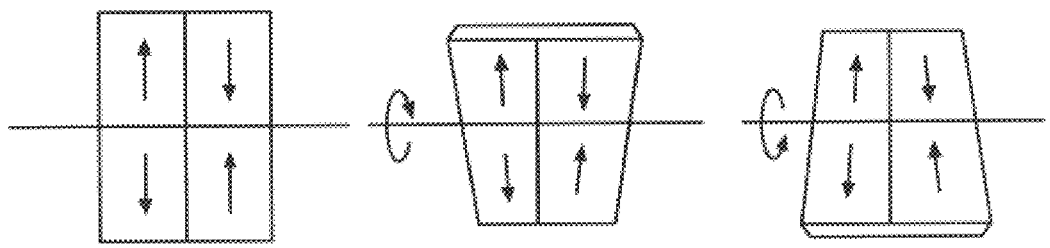
FIG. 2

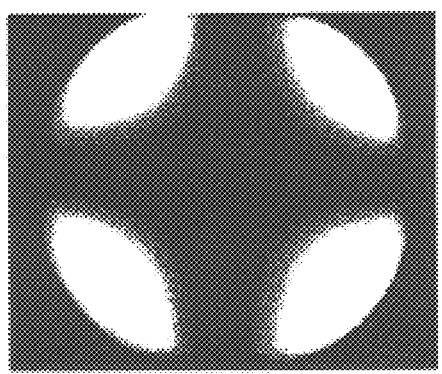 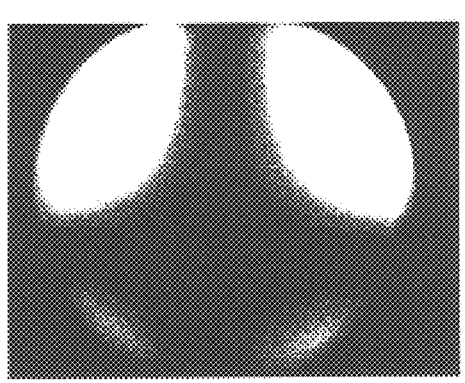
*FIG. 3a*      *FIG. 3b*
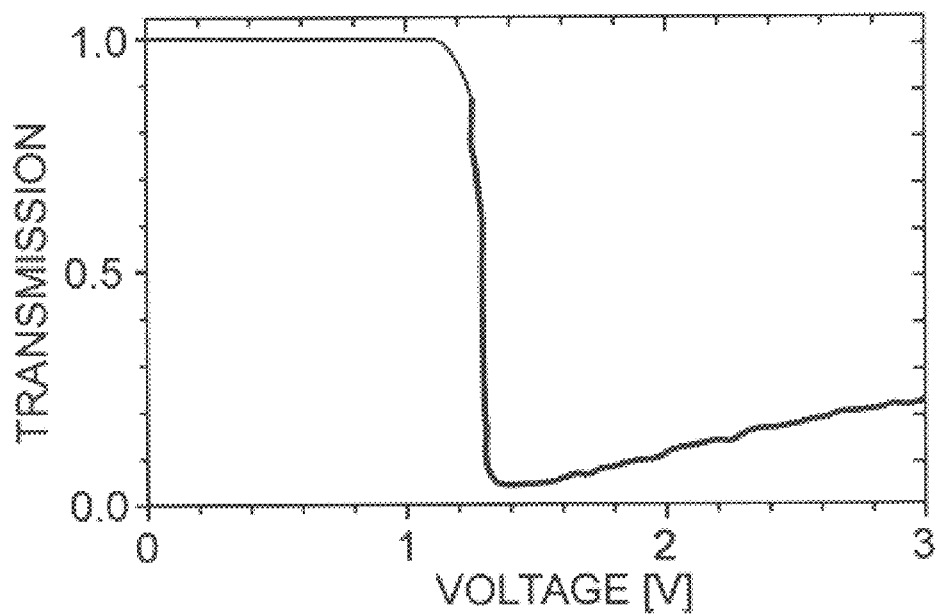
*FIG. 4*

PHOTO-ORIENTED POLYMER NETWORK MATERIAL HAVING DESIRED AZIMUTHAL ORIENTATION AND TILT ANGLE AND METHOD FOR ITS PRODUCTION

This application is a continuation of U.S. Ser. No. 08/690,665, filed Jul. 26, 1996, which is a continuation in part of U.S. Ser. No. 08/601,310, filed Feb. 16, 1996, now U.S. Pat. No. 5,838,407, which is a continuation of U.S. Ser. No. 08/373,733, filed Jan. 17, 1995 abandoned, U.S. Ser. No. 08/271,550, filed Jul. 7, 1994, abandoned U.S. Ser. No. 08/125,005, filed Sep. 21, 1993 abandoned and U.S. Ser. No. 07/910,066, filed Jul. 8, 1992 abandoned.

BACKGROUND OF THE INVENTION

1. Field

The invention relates to a method of producing a photo-oriented structurally anisotropic polymer network ("PPN") having any desired azimuthal orientation direction and a tilt angle on its surface, to orientation layers prepared by this method for orienting monomeric and polymeric liquid crystals, to the use of this method, and the orientation layers produced thereby.

2. Description

Uniaxially rubbed polymer orientation layers, such as polyimide are conventionally used to orient liquid crystal molecules in liquid crystal displays ("LCD"). The rubbing direction determines the orientation direction and during the rubbing process a tilt angle is produced on the polymer surface.

When a liquid crystal is placed in contact with such a surface the liquid crystal molecules are disposed not parallel to the surface but at an inclination thereto—that is, the tilt angle is transferred to the liquid crystal. The size of the tilt angle is determined by rubbing parameters, for example, feed rate and pressure, and by the chemical structure of the polymer. For example, there are many structurally different polyimides which when subjected to identical preparation and rubbing parameters lead to completely different tilt angles. Tilt angles between 1° and 15° depending upon type, are necessary for the preparation of liquid crystal displays. The larger tilt angles are required more particularly for supertwisted nematic ("STN") LCDs in order to avoid the incidence of so-called finger print textures. In twisted nematic ("TN") and thin film transistor ("TFT")-TN-LCDs, the tilt angle defines the rotational and the tilt direction so that reverse twist and reverse tilt phenomena are inhibited. Reverse twist in the "off" state leads to zones with a wrong direction of twist, a phenomenon which is optically perceptible as a spotty appearance of the display. In contrast, reverse tilt (occuring more particularly when the LCDs are actuated) causes a very disturbing optical effect due to the liquid crystals tilting in different directions. Also, reverse twist can be inhibited by doping the liquid crystal mixture with a chiral dope of appropriate direction of rotation. However, to suppress reverse tilt there is no alternative but to use orientation layers having a tilt angle.

Although rubbed polymer layers have proved very satisfactory for orienting liquid crystals in LCD production, there are a number of serious disadvantages causally related to the rubbing. Because of optically inadequate displays, LCD production yield is unsatisfactory since rubbing (1) is associated with the production of dust and (2) produces an electrostatic charge on the polymer layer. This can result, for example in the case of TFF-TN LCDs, in the destruction of thin film transistors below, as well as the attraction of additional dust to the surface. Another serious disadvantage is that when a large area is rubbed, the orientation direction cannot be varied locally. Accordingly, there is therefore no practical way of enhancing the viewing angle dependency of TN LCDs.

Recently orientation layers have become known wherein the orientation direction can be determined by exposure with linearly polarized light. The problems inherent in rubbing can therefore be avoided. The additional possibility of zone-wise differentiation of orientation directions opens up completely new possibilities for optimising the properties of liquid crystal displays, for example, the viewing angle dependency of TN LCDs.

U.S. Pat. No. 4,974,941, the contents of which are herein incorporated by reference, describes a process based on a guest-host system wherein a preferred direction is induced in response to exposure with linearly polarized light of an appropriate wavelength by the cis/trans-isomerization of dyes. Liquid crystals in contact with a surface thus exposed are oriented in accordance with this preferred direction. This orientation process is reversible—that is, by further exposure of the layer to light of a second polarization direction the orientation direction already written in can be rotated again. Since this re-orientation process can be repeated as often as required and needs high light intensities, orientation layers on this basis are less suitable for use in LCDs.

In contrast to this reversible orientation process, in the photostructurable orientation layers such as described in U.S. Pat. No. 5,389,698, the contents of which is herein incorporated by reference, an irreversible anisotropic polymer network is built up. The anisotropic orienting properties induced in the network during the exposure to linearly polarized light are photostable and so cannot be further re-oriented by further exposures. The photo-orientated polymer networks ("PPN") are therefore of use more particularly wherever stable, structured or unstructured liquid crystal orientation layers are required. In addition to being used in LCDs, orientation layers of this kind are useful in preparating other optical elements, such as non-absorptive color filters, linear and cholesteric polarizing filters, optical delay layers, and the like.

More particularly for use in LCDs, the orientation layer must transfer the tilt angle as well as the orientation direction. However, endeavors to induce a tilt angle in photostructurable orientation layers have so far proved unsatisfactory. The only process known so far has been described in Hashimoto, T. et al in SID 95 DIGEST, 877 (1995) wherein a combination of two consecutive exposures in different conditions can produce a tilt angle. The first exposure is carried out with a vertical incidence of light whereas in the second exposure the incident of light is grazing, the direction of polarization of the light having to be turned through 90° relative to the first exposure. The orientation direction of the polyvinyl cinnamate photopolymer used is perpendicular to the polarization direction of the incident UV light. Consequently, only the orientation direction is determined in the first exposure and for reasons of symmetry no preferred direction for the tilt angle can be given. In the second exposure with inclined incidence of light and a 90° offset polarization direction an orientation is built up perpendicularly to the previous orientation, something which of course reduces the orientability of the first direction. A tilt angle arises because of the asymmetrical decrease of the orientation produced by the first exposure. A compromise must therefore be made in the second exposure—the second exposure time must be long enough to induce a tilt angle, but short enough not to completely destroy the existing orientation. The PPN material must necessarily still not be photostable after termination of the first exposure if it is to be possible to make the second exposure. Consequently, and because of unsatisfactory thermal stability, the polyvinyl cinnamate used (which is of course not photostable) is of little use for LCDs.

In the known PPN materials and PPN orientation processes, irradiation with linearly polarized UV light incident parallel to the normal to the surface is used to produce an orientation perpendicular to the polarization direction of the light. The PPN materials having this property will be called hereinafter "perpendicularly orienting", whereas PPN materials which under the same conditions produce an orientation parallel to the polarization direction of the UV light will be called "parallelly orienting".

It is the object of the invention to devise a simple process, and appropriate photostructurable materials, such that during exposure a defined long-term-stable tilt angle combined with any required azimuthal angle can be programmed.

SUMMARY OF THE INVENTION

The subject invention provides a method of producing a photo-oriented polymer network having a tilt angle. The method comprises providing a photo-orientable material having a surface, the photo-orientable material orienting parallel to the polarization direction of an exposing light, and exposing the photo-orientable material to light such that the direction of incidence of the light is not parallel to the normal to the surface of the photo-orientation material to produce the photo-oriented polymer network.

The subject invention also provides for an orientation device having an orientation layer containing the photo-oriented polymer network produced by the above method.

BRIEF DESCRIPTION OF THE FIGURES

Exemplified embodiments of the invention will be described hereinafter with reference to the accompanying drawings wherein:

FIG. 1 is a diagrammatic representation of the exposure of a PPN layer;

FIG. 2 is a diagrammatic representation of an LC layer having a tilt angle pattern;

FIG. 3 shows conoscopic images of a cell having a tilt angle induced in accordance with the invention without and with voltage applied to the electrodes, and FIG. 4 shows a transmission curve of an STN cell having a tilt angle induced in accordance with the invention.

DETAILED DESCRIPTION OF THE PREFERRED EMBODIMENT

The subject invention will now be described in terms of its preferred embodiments. These embodiments are set forth to aid in understanding the invention but are not to be construed as limiting.

To this end, according to the invention, a PPN material orienting parallel to the polarization direction of the exposing light is so exposed that the direction of incidence of the light is not parallel to the normal to the surface of the photo-orientable layer. A distinctive feature of orientation layers prepared by this method is that the tilt angle varies locally.

To produce a tilt angle on the surface of a PPN material an asymmetry relative to the normal to such surface must be built up. This might be effected, for example, during the preparation of the layer, by programming a preferred direction in the application of the layer. In this case, however, the advantage of the photostructurability of the PPN layer would be lost since, as with rubbing, the tilt angle direction would turn out to be consistent over a large area. The most advantageous way of ensuring photostructurability is therefore to introduce the asymmetry during the exposure of the layer. This can be effected by exposing the PPN layer to an inclined incidence of light. However, the orientation direction of the known PPN materials is in all cases perpendicular to the polarization direction of the incident light. Consequently, for reasons of symmetry the direction information of the obliquely incident light is lost so far as the production of the tilt angle is concerned, and so these systems cannot be used to produce tilt angle by a single exposure.

Surprisingly it has proved possible to induce a tilt angle by inclined exposure in PPN materials for which, unlike the known PPN materials, the orientation direction is parallel to, and not perpendicular to, the polarization direction of the exposing linearly polarized UV light. The polarization direction of the light in the exposure of the layer was disposed in the plane described by the normal to the surface and by the direction of the incident light. Since in the case of inclined exposure the electrical field vector of the light is at an inclination to the surface, the photo cross-linking also occurs preferably at an inclination to the surface, with the surprising result on the polymer surface of a preferred orientation direction other than in the plane of the surface. The magnitude of the tilt angle can be controlled by various physical parameters such as the angle of incidence and the exposure time.

One possible way of preparing PPN material-based orientation layers having a large tilt angle is first to induce a tilt angle in a PPN layer by inclined exposure and then, as described in EP-A-611 981 (corresponding to U.S. application Ser. No. 08/194,234, filed Feb. 10, 1994, the contents of which are herein incorporated by reference), to apply a layer of cross-linkable liquid crystals. Orientation and tilt direction are transferred from the PPN layer to the liquid crystals and fixed by the subsequent cross-linking. Appropriate choice of the cross-linkable liquid crystal molecules enables mixtures to be developed which tend to take up a perpendicular orientation on the boundary surface between the liquid crystal and air. However, liquid crystal inclination does not vary over thickness in very thin layers whereas in relatively thick layers the inclination to the surface increases. Consequently, the liquid crystal layer ("LCP") which has been oriented by the PPN layer, tilted and then cross-linked can be used as an orientation layer for liquid crystals, the magnitude of the tilt angle at the LCP/air boundary layer being adjustable over a wide range by the thickness of the LCP layer.

Since they enable a tilt angle to be produced, the PPN materials suitable for this effect can be used instead of rubbed polymer layers as orientation layers for liquid crystals in various kinds of liquid crystal displays. The structurability of the PPN layers, in addition to providing the advantage of contact-free orientation, has the main effect of opening up completely new ways of optimizing liquid crystal displays. For example, adjacent zones measuring a few mm can be produced which have different azimuthal orientation directions and defined tilt angles.

According to the invention, the direction of the tilt angle can be altered from zone to zone. The magnitude of the tilt angle can even be varied locally by exposure from different directions. For instance, the optics of adjacent pixels in LCDs can be varied by variation of the orientation and the tilt angle or the optics of a single pixel can be varied by the pixel being subdivided into subpixels each having a different orientation direction and/or tilt angle direction. The multi-domain LCDs which then become possible greatly enhance the viewing angle dependency. In the case of the multidomain LCDs which are described in Yang, K. H. in IDRC 91 DIGEST, 1991, 68 and which are based on two rubbings of a polyimide layer, the same is coated with photoresist after the first rubbing, a pattern is exposed therefrom photolithographically and rubbing is then effected in a second direction. In contrast to this elaborate and unreliable procedure the photo-orientation of PPN layers has fewer and also contact-free working steps, so that output is much higher.

As in the case of TN-LCDs the viewing angle dependency of STN-LCDs can be enhanced by subdividing each pixel into two or more subpixels, the azimuthal orientation direction on the two orientation layers differing from subpixel to subpixel. In the case of STN-LCDs needing a higher tilt angle than TN-LCDs, the tilt angle has an even greater effect on the operation and electro-optical behaviour than in the case of TN-LCDs. The multiple rubbing of polyimide layer is of little use for multidomain STN-LCDs since it is almost impossible to expunge in a second rubbing the tilt angle produced in the first rubbing while simultaneously producing an exactly equal tilt angle in another direction.

As well as being simpler to handle, PPN materials are particularly suitable as orientation layers for multidomain STN-LCDs since because of the structuring using photomasks each subpixel is exposed only once and so the tilt angle in each subpixel is the same.

The color compensation necessary for colored STN liquid crystal displays cannot be produced in multidomain STN-LCDs by the conventional application of retarder films on the outsides of the glass plates since the optical axis of the retarder must be at a defined angle to the orientation direction of the liquid crystal. The optical axis of the retarder must therefore be adjusted for each subpixel in accordance with the particular liquid crystal orientation concerned. Instead, structured retarders such as described in EP-A 94101684.2 (corresponding to U.S. application Ser. No. 08/194,234, filed Feb. 10, 1994, the contents of which are herein incorporated by reference) are suitable, so that layer structures consisting of retarder and orientation layer can be built up in accordance with EP-A 95108817.8 (corresponding to U.S. application Ser. No. 08/489,865, filed Jun. 13, 1995, the contents of which are herein incorporated by reference). Also, a PPN layer has written into it an orientation pattern whose local orientation coincides with the required direction of the optical axis concerned. There is then applied to the PPN layer an LCP layer which has the required optical delay and in which the optical axis varies locally in accordance with the orientation pattern of the PPN layer below. To avoid parallaxes the structured retarder layer inside the LCDs must be disposed between the glass plate and the LC orientation layer.

In addition to the orientation of liquid crystals in LCDs, defined tilt angles are very useful for preparing domain-free layers from cross-linked liquid crystals (LCP) such as are described in EP-A-611 981 or in the still unpublished European patent applications Nos. 95 108817.8 and 95 108866.5 (corresponding to U.S. application Ser. No. 08/489,866, filed Jun. 13, 1995, the contents of which are herein incorporated by reference). These hybrid layers can be used for the preparation of optical delay layers, polarizing interference filters, linear polarizers and circular polarizers and so on. Optically biaxial layers can be produced by stacking delay layers having tilted optical axes. Azimuthal orientation and tilt angle can be adjusted individually pixelwise for each layer. Delay layers which are optically biaxial or whose optical axis is at an inclination to the surface are required more particularly to further enhance the viewing angle dependency of STN liquid crystal displays.

Safety elements based on PPN-oriented LCP layers such as described in the still unpublished European patent applications Nos. 95 108817.8 and 95 108866.5 can be further refined by an additional feature by the production of a defined tilt angle. Data in the form of text, patterns or images can be written into PPN-LCP hybrid layers by different azimuthal orientation. Read-out using one or two polarizers can be based either on the birefringency of the LCP layer or the anisotropy of dichroic dyes oriented in the LCP layer.

If in accordance with the invention a defined tilt angle which is taken over by the LCP layer and possibly even increased is programmed in the exposure of the PPN layer, an asymmetric tilt effect is also produced. Since the LCP molecules are at an inclination to the surface, the rotation of such a layer around an axis which is disposed in the layer plane and which is perpendicular to the orientation direction of the LCP molecules (optical axis), causes the angle between the optical axis and the viewing direction to be reduced or increased in accordance with the direction of rotation. Since in this case the birefringency of birefringent layers is reduced or increased, the result in the case of layers having optical delays of up to approximately 300 nm is an asymmetrical light/dark effect, while in the case of greater optical delay the two possible direction of rotation produce different colors.

In the case of dichroic layers the tilting of the layer in the two different directions results in less or greater absorption respectively, with the result of an asymmetric variation of contrast. Since in accordance with the invention the direction of the tilt angle can be varied locally, it is therefore even possible for the first time to encrypt information without variation of the azimuthal orientation and solely by the direction of the tilt angle. In this case the information is not initially visible when viewed perpendicularly, but appears only when the layer is tilted. In this case the appearance again depends upon the direction of rotation, for when the layer is tilted in the opposite direction the zones change over their different brightness or colour—i.e., the pattern represented is inverted. It is of course possible to provide local variation in a layer of both the directions of the azimuthal orientation and also of the tilt angle. In this case zones having the same azimuthal orientation differ from one another in the direction of the tilt angle. When such a layer is viewed perpendicularly, a pattern written in by different azimuthal orientation is observed. When the layer is tilted a second pattern is superimposed upon the first pattern and can also be inverted by tilting in the opposite direction. Complex unequivocally verifiable security elements which are very difficult to counterfeit can be produced in this way.

The following examples further illustrate the subject invention.

EXAMPLE 1

Preparation of a photostructured PPN layer

To induce a tilt angle by inclined exposure, according to the invention a PPN material capable of orienting liquid crystals parallel to the polarization direction of the incident UV light is required. Examples of appropriate PPN materials having this property are the following photopolymers used in the following examples:

PPN 1:

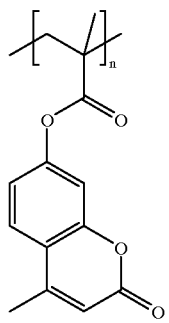

PPN 2:

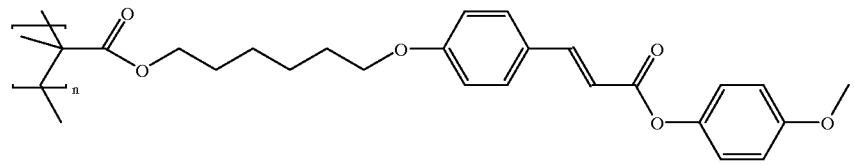

PPN 3:

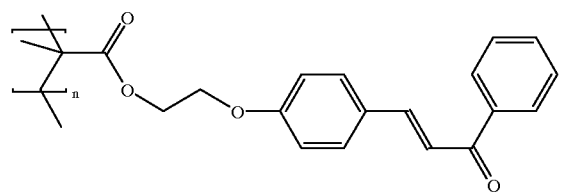

PPN 4:

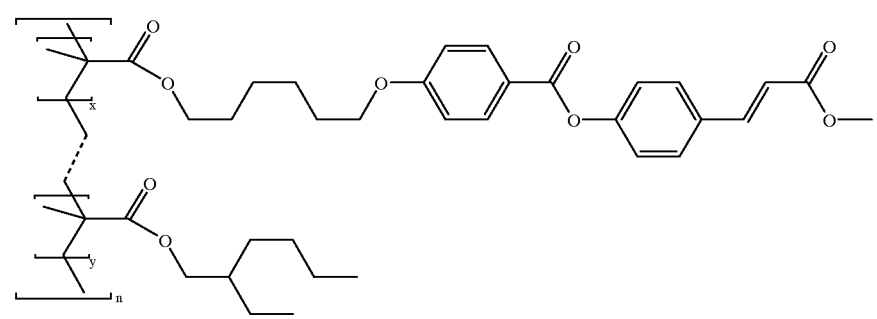

x:y = 9:1

The PPN material in each case was dissolved in NMP to a concentration of 5%. This solution was then used to apply a PPN layer to a glass plate by spin coating at 2000 rpm. The layer was then dried for 2 hours at 130° C. on a heat bench and for a further 4 hours at 130° C. in vacuo.

EXAMPLE 2
Exposure of a PPN Layer to Produce a Tilt Angle

As in example 1 a layer 2 of the photopolymer PPN 1 was prepared on a glass plate 1, whereafter, as shown in FIG. 1, the left half of the layer was exposed to vertically incident linearly polarized light from a 200 W Hg very high pressure lamp. The right half remained covered during this exposure. The PPN-coated plate was then turned through 70° around an axis perpendicular to the incident direction 3 and the right half of the layer was exposed for three minutes to the polarized UV light. In this inclined exposure the polarization direction was chosen to be in the plane formed by the perpendicular 4 to the plate and by the incident direction of the UV light. The increased exposure time of the inclined exposure took account of the reduced effective incident lamp intensity due to rotation of the plate. An approximately 1 mm thick layer of a nematic liquid crystal was then applied to the exposed PPN layer by spin coating. When the plate was then viewed under crossed polarizers, it was seen that the liquid crystal had been oriented over the entire plate surface parallel to the UV polarization direction used.

However, when viewed under the polarization microscope a large number of domains of a size of some tens of mm could be seen in the left half of the plate, whereas the right half was free from domains. When the plate was arranged with the orientation direction at 45° to the cross polarizers, it was consistently light because of the birefringency. When the plate was then tilted around an axis perpendicularly to the orientation direction, about half the domains of the left side of the plate became lighter (increased birefringency) and the other half became darker (less birefringency). When the plate was tilted in the opposite direction, the domains changed from light to dark and vice versa. The asymmetrical change in birefringency when the plate was tilted showed that the liquid crystal molecules had tilted relatively to the plate surface. Since no direction had been marked out in the exposure of the left half of the plate no preferred tilting of the liquid crystal molecules was to be expected, and so there were domains which differed from one another in their tilt direction.

When the right half of the plate was observed, the whole surface became lighter in the case of tilting in one direction but darker in the case of tilting in the opposite direction. The inclined exposure had therefore produced in this zone a tilt angle in the PPN material, so that the liquid crystal molecules were tilted consistently in the direction thus programmed.

EXAMPLE 3
LC Layer with Tilt Angle Pattern

A layer was prepared from the photopolymer PPN 2 in accordance with Example 1. A chromium mask containing a checkered pattern of squares of 3 mm side length was placed on the layer. The PPN-coated plate together with the mask was placed at an angle of +70° to the direction of incident light of a UV lamp and exposed through the mask. As in Example 2 the polarization direction was disposed in the plane bounded by the perpendicular to the plate and the UV incidence direction. The mask was then removed and the PPN plate turned in the opposite direction so that the normal to the plate and the UV incidence direction formed an angle of −70°. The subsequent second exposure could be made without a mask because of the photostability of the PPN material.

After the exposure a cross-linkable nematic liquid crystal mixture was dissolved in anisole and applied to the PPN layer by spin coating. The mixture consisted mainly of molecules having strongly polar cyano terminal groups tending to take up a position perpendicular to the surface at the boundary layer with the air, so that existing tilt angle is increased. The cross-linkability was produced by adding to the mixture 5% of the following diacrylate component:

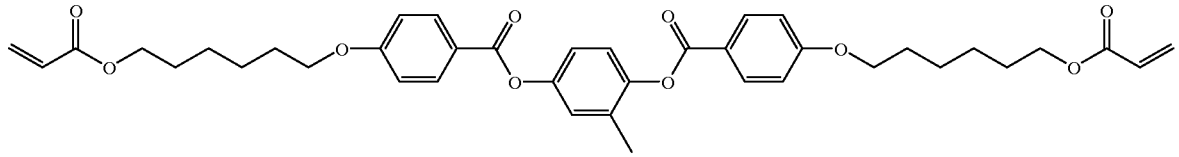

The mixture also contained 2% of the photo-initiator IRGACURE 369 produced by Ciba. The liquid crystal layer was then cross-linked by being exposed for about 30 minutes to the isotropic light of a 150 W xenon lamp.

It could be seen under cross-polarizers that the liquid crystal molecules had been oriented consistently in one direction over the entire area. As shown on the left of FIG. 2, no pattern was recognisable in perpendicular viewing. When the layer was positioned with the orientation direction of the liquid crystals at an angle of 45° to the polarizers, birefringency was maximum. When, as shown in the centre of FIG. 2, the plate was tilted around an axis perpendicularly to the orientation direction, the checkerboard pattern with light and dark zones became clearly recognisable. When the plate was tilted in the opposite direction as shown on the right of FIG. 2 the complementary checkerboard pattern was obtained —i.e., the light and dark zones were changed over. The appearance of the pattern despite consistent azimuthal orientation of the liquid crystal molecules was due to the differently directed tilt angles induced in the two inclined exposures, the latter angles having been transferred from the PPN material to the liquid crystal layer. In the tilting, the zones in which the longitudinal axis of the liquid crystal (optical axis) was at an inclination to the viewing direction became dark whereas the zones whose optical axes had turned away from the viewing direction became lighter, so that birefringency was increased.

To make the induced tilt angle clearly visible, the liquid crystal mixture used in this example consisted largely of non-cross-linkable highly polar molecules, and so the mechanical stability of the cross-linked layer was not very high. Instead of this, of course, a liquid crystal mixture consisting solely of cross-linkable molecules can be used, so that a dense network and, therefore, high mechanical and thermal stability can be achieved. Tilt angle patterns of this kind having an asymmetrical viewing angle dependency can be used, for example, as a security element for credit cards, identity cards or the like.

EXAMPLE 4
Two TN-LCD Domains

A PPN 3 coated glass plate having ITO electrodes was exposed as in Example 3 with a checkerboard pattern. Half of the zones were illuminated diagonally through a chromium mask in a first exposure process at an angle of +70° while the remaining zones were then exposed at an angle of −70°. A cell with a plate separation of 10 mm was constructed with this plate and a second ITO glass plate having a rubbed polyimide orientation layer. The rubbing direction of the polyimide layer was perpendicular to the orientation direction of the PPN plate. The cell was then filled with a liquid crystal mixture at a temperature slightly above the clarification point of the mixture, then slowly cooled. Under crossed polarizers a rotatory cell was identified which had a twist of 900 and a rotatory direction alternating from zone to zone. A tilt angle responsible for the alternately left-rotatory and right-rotatory zone was therefore induced by the different radiation direction in the exposure of the PPN layer. In TN-LCDs, subdividing the pixels into subpixels which differ from one another by the direction of rotation as in this example can provide so-called two-domain TN-LCDs which have a much improved viewing angle dependency as compared with conventional TN-LCDs.

If photostructured orientation layers are used on both sides four-domain TN-LCDs can be produced which further improve the viewing angle dependency.

EXAMPLE 5
Measurement of the Tilt Angle

Layers of PPN 1 were applied to two glass plates coated with transparent ITO electrodes as in Example 1. Both layers were then exposed over their entire surfaces with inclinedly incident linearly polarized UV light. The polarization direction was disposed in the plane bounded by the perpendicular to the plate and the direction of UV incidence. The two plates were then assembled to form a parallel cell with a between-plates distance of 20 μm, the parallel cell was filled with a nematic liquid crystal mixture at a temperature slightly above the clarification point of the mixture. After the cell had cooled slowly it changed over consistently when a voltage was applied to the two electrodes. No reverse tilt was observed. The tilt angle induced in the inclined exposure had therefore been transferred to the liquid crystal molecule in the cell. The tilt angle of the liquid crystals is then measured optically by the crystal rotation method. A tilt angle of 0.6° was found.

EXAMPLE 6
Effect of the Angle of Incidence on the Tilt Angle

Two glass plates were coated with PPN 4 as in Example 5. In contrast to Example 5 the layers were exposed to UV light incident at an angle of 70° to the normal to the surface. The effective radiation time was the same as in Example 5 so that the actual radiation time, which had to be corrected by the geometry factor, was 88 minutes. The parallel cell formed by the two plates was again filled with the liquid crystal mixture 7728 of ROLIC AG. The tilt angle of the liquid crystal was 1.4° in this case.

EXAMPLE 7
Variation of Tilt Angle During Exposure Time

As in Example 6 two ITO-coated glass plates were coated with PPN 4 and exposed diagonally at an angle of 70°. However, in this case the exposure time was 12 minutes and not 88 minutes. As in Examples 5 and 6 a parallel cell was constructed from the two plates and filled with the liquid crystal mixture 7728 of ROLIC AG. It could be seen under crossed polarizers that the liquid crystal no longer had a planar orientation; instead, the conoscopic imaging (FIG. 3a) showed that the liquid crystal molecules were substantially perpendicular to the orientation layer. However, the fact that they were slightly inclined to the normal to the surface was apparent from the difference from the actually perpendicular (homeotropic) orientation produced after the application of a voltage of 6 volts to the two ITO electrodes, so that the conoscopic cross was shifted to the centre (FIG. 3b). The subsequent measurement of the tilt angle showed that the longitudinal axis of the liquid crystal molecules was at an angle of 86° to the plate surface.

Variation of the radiation angle and irradiation time enables the tilt angle to be adjusted to any value between 0° and 90°.

EXAMPLE 8
LPP Oriented STN Cell

Two ITO-coated glass plates were coated with PPN 4 and exposed diagonally at 70° for 60 minutes. The two plates were so combined that a left-rotatory 240° STN cell was produced. The between-plates gap was adjusted by spacers to 7 mm. The mixture 7728 was doped with 0.73% of the left-rotatory chiral dope CM 9209F of ROLIC AG and charged into the cell. No fingerprint textures were observed when a voltage was applied. The transmission curve of the cell (FIG. 4) revealed a steepness of $V_{90}/V_{10}=1.06$. This shows that the cell operates in the STN mode.

Orientation layers having a tilt angle sufficient for STN cells can therefore be prepared by diagonal exposure of parallel orienting PPN materials.

Upon reading the present specification, various alternative embodiments will become obvious to those skilled in the art. These embodiments are to be considered within the scope and spirit of the subject invention which is only to be limited by the claims that follow and their equivalents.

What is claimed is:

1. A method of providing an orientation layer comprising:
   providing on a substrate a material that is responsive to polarized light; and
   performing a first exposure of the material to the polarized light,
   wherein the first exposure induces an orientation direction and a tilt angle to the material.

2. The method of claim 1, wherein the orientation layer is responsive to linearly polarized light and wherein performing the first exposure includes performing the first exposure of the material to the linearly polarized light.

3. The method of claim 2, wherein the material comprises a photopolymer that undergoes oriented polymerization when exposed to the linearly polarized light.

4. The method of claim 3, wherein the material comprises a parallel orienting PPN material.

5. A method of providing an orientation layer comprising:
   providing on a substrate a material that is responsive to polarized light; and
   exposing the material to the polarized light,
   wherein the exposing of the material to the polarized light induces an orientation direction and a tilt angle to the material, and wherein at least one of the orientation direction and the tilt angle is photostable.

6. The method of claim 5, wherein the orientation layer is responsive to linearly polarized light and wherein the exposing includes exposing the material to the linearly polarized light.

7. The method of claim 6, wherein the material comprises a photopolymer that undergoes oriented polymerization when exposed to the linearly polarized light.

8. The method of claim 7, wherein the material comprises a parallel orienting PPN material.

9. A method of providing an orientation layer comprising:
   providing on a substrate a material that is responsive to linearly polarized light; and
   exposing the material to the linearly polarized light,
   wherein the exposing of the material of the linearly polarized light induces an orientation direction and a tilt angle to the material, and wherein the orientation direction is parallel to a direction of polarization of the linearly polarized light.

10. The method of claim 9, wherein the material comprises a photopolymer that undergoes oriented polymerization when exposed to the linearly polarized light.

11. The method of claim 10, wherein the material comprises a parallel orienting PPN material.

12. A method of providing an orientation layer comprising:
   providing on a substrate a material that is responsive to polarized light;
   positioning a mask adjacent to the material;
   exposing, through the mask, a first portion of the material to the polarized light to induce a first orientation direction and a first tilt angle to the first portion of the material;
   removing the mask; and
   exposing the first portion of the material and a second portion of the material to the polarized light to induce a second orientation direction and a second tilt angle to a second portion of the material.

13. The method of claim 12, wherein the orientation layer is responsive to linearly polarized light and wherein the exposing of the first and second portions of the material include exposing the material to the linearly polarized light.

14. The method of claim 13, wherein the material comprises a photopolymer that undergoes oriented polymerization when exposed to the linearly polarized light.

15. The method of claim 14, wherein the material comprises a parallel orienting PPN material.

16. The method of claim 12, wherein the first orientation direction is different from the second orientation direction.

17. The method of claim 14, wherein the first orientation direction is the same as the second orientation direction.

18. The method of claim 12, wherein the first title angle is different from the second tilt angle.

19. The method of claim 12, wherein the first tilt angle is the same as the second tilt angle.

20. A method of providing an orientation layer comprising:

providing on a substrate a material that is responsive to polarized light; and exposing the material to the polarized light to induce an orientation direction and a tilt angle to the material, wherein the exposing includes controlling an irradiation angle and an irradiation time to adjust the tilt angle to any value between 0° and 90°.

21. The method of claim 20, wherein the orientation layer is responsive to linearly polarized light and wherein the exposing includes exposing the material to the linearly polarized light.

22. The method of claim 21, wherein the material comprises a photopolymer that undergoes oriented polymerization when exposed to the linearly polarized light.

23. The method of claim 22, wherein the material comprises a parallel orienting PPN material.

24. A method for producing a photo-oriented polymer network having a characteristic of imparting a tilt-angle to liquid crystal material adjacent to it, which comprises providing a photo-orientable material having a surface, the photo-orientable material being one which orients parallel to the polarization direction of light to which it is exposed, and exposing the photo-orientable material to light such that the direction of incidence of the light is not parallel to the normal to the surface of the photo-orientable material to produce a photo-oriented polymer network.

25. The method of claim 24, wherein the photo-oriented polymer network imparts a permanent tilt-angle to the liquid crystal material.

* * * * *

UNITED STATES PATENT AND TRADEMARK OFFICE
CERTIFICATE OF CORRECTION

| | | |
|---|---|---|
| PATENT NO. | : 6,300,991 B1 | Page 1 of 1 |
| APPLICATION NO. | : 09/510364 | |
| DATED | : October 9, 2001 | |
| INVENTOR(S) | : Martin Schadt, Andreas Schuster and Hubert Seiberle | |

It is certified that error appears in the above-identified patent and that said Letters Patent is hereby corrected as shown below:

Under the Related U.S. Application Data, please change the following:

(63)  Continuation of application No. 08/690,665, filed on Jul. 26, 1996, ~~which is a continuation-in-part of application No. 08/601,310, filed on Feb. 16, 1996, now Pat. No. 5,838,407, which is a continuation of application No. 08/373,733, filed on Jan. 17, 1995, now abandoned, which is a continuation of application No. 08/271,550, filed on Jul. 7, 1994, now abandoned, which is a continuation of application No. 08/125,005, filed on Sep. 21, 1993, now abandoned, which is a continuation of application No. 07/910,066, filed on Jul. 8, 1992, now abandoned.~~

Column 1, line 6, please change as follows:

This is a continuation of application Serial No. 08/690,665, filed July 26, 1996, which is incorporated herein by reference.
~~This application is a continuation of U.S. Ser. No. 08/690,665, filed on Jul. 26, 1996, which is a continuation-in-part of U.S. Ser. No. 08/601,310, filed on Feb. 16, 1996, now U.S. Pat. No. 5,838,407, which is a continuation of U.S. Ser. No. 08/373,733, filed Jan. 17, 1995 abandoned, U.S. Ser. No. 08/271,550, filed Jul. 7, 1994, abandoned U.S. Ser. No. 08/125,005, filed on Sep. 21, 1993, abandoned and U.S. Ser. No. 07/910,066, filed Jul. 8, 1992 abandoned.~~

Signed and Sealed this

Sixteenth Day of December, 2008

JON W. DUDAS
*Director of the United States Patent and Trademark Office*